May 20, 1947.　　　R. J. FRUENDT　　　2,420,743
LOCK
Filed July 14, 1944　　　6 Sheets-Sheet 1

May 20, 1947.  R. J. FRUENDT  2,420,743
LOCK
Filed July 14, 1944  6 Sheets-Sheet 2

May 20, 1947. R. J. FRUENDT 2,420,743
LOCK
Filed July 14, 1944 6 Sheets-Sheet 3

Inventor:
Richard J. Fruendt.

May 20, 1947.        R. J. FRUENDT        2,420,743
LOCK
Filed July 14, 1944        6 Sheets-Sheet 4

May 20, 1947.　　　R. J. FRUENDT　　　2,420,743
LOCK
Filed July 14, 1944　　　6 Sheets-Sheet 5

Patented May 20, 1947

2,420,743

UNITED STATES PATENT OFFICE 2,420,743

LOCK

Richard J. Fruendt, Chicago, Ill., assignor of one-half to F. P. Smith Wire and Iron Works, Chicago, Ill., a corporation of Illinois Application July 14, 1944, Serial No. 544,853

13 Claims. (Cl. 70—462)

This invention relates to a lock and more particularly to a door lock of the "latch-lock" type, i. e., which may be opened by a knob on the in-door side and by a key on the out-door side.

While the invention broadly refers to a lock of the kind referred to, it is particularly adaptable to a door for a cage-like enclosure, for example, having wire mesh fabric as its walls, and is further adaptable by reason of a new and improved structure to be arranged in any one of a plurality of conditions likely to be encountered in practice. However, it will be clear that the invention in its essence is not limited to any specific door or for that matter doors generally, as it may be employed on different types of closure for which a latch-lock is suitable.

For convenience and clarity, the invention will be described as used with a cage-like enclosure in which the door may take several forms, i. e.:

I. Sliding door
    (a) Outside the cage
        (1) Lock on left
        (2) Lock on right
    (b) Inside the cage
        (1) Lock on left
        (2) Lock on right
II. Swinging door
    (a) To swing outwardly of cage
        (1) Lock on left
        (2) Lock on right
    (b) To swing inwardly of cage
        (1) Lock on left
        (2) Lock on right Basically, the lock of the invention may be used in any of the eight installations just tabulated, and with the use of a single design of strike or keeper.

Heretofore, a particular kind of closure called for a particular type of lock, and a lock designed for a specific application could be used only for that purpose, or, at best, in one of two positions. Accordingly, the manufacturer was obliged to make, and the dealer to carry in stock, a large variety of forms of one general class of lock so that all conditions met in practice could be satisfied. Under those conditions, it will be appreciated that many savings in manufacture and reduction of unnecessary inventory may be effected by minimizing the number of styles of lock of one general type.

Accordingly the primary object of my invention is to provide a latch-lock of a simple, reliable type adapted to be installed in a variety of positions.

Another object is to attain the aim aforesaid by the employment of a minimum number of parts.

A further object is the provision of a standard casing, and standard key-operated means which when associated with interchangeable bolt members may be fitted to a wide variety of installations.

Another aim is the provision of interchangeable bolt members as aforesaid so designed as to be quickly and easily interchanged or reversed in position in the casing.

A further object is the provision of interchangeable bolt members as aforesaid, which, under certain conditions, may be reversed for a different door action without disturbing the position of the lock on the door.

An additional object is the provision of a lock of the type described which may be readily converted at the dealer's store or in the field by the use of a screwdriver only.

Another aim is to provide a lock as described which is adaptable to both sliding and swinging doors and with a minimum of alteration in the moving parts.

Further objects will appear as the description proceeds.

Figure 1:
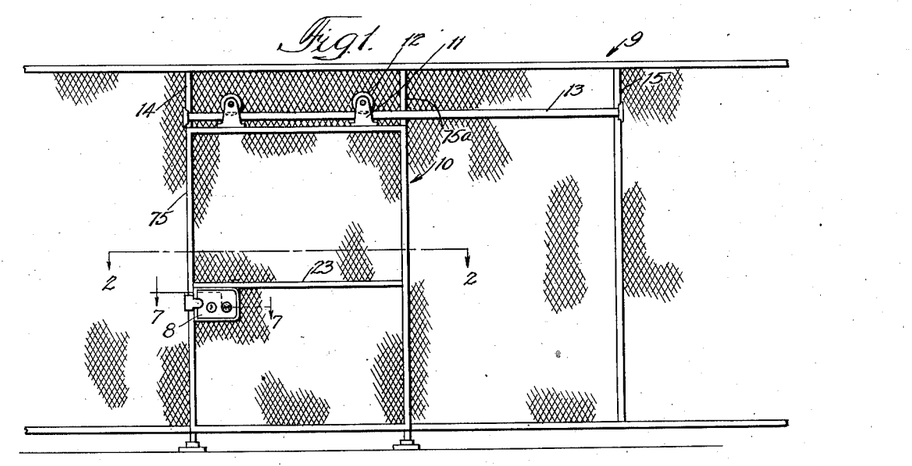
Figure 1 is an elevational view of a section of a wire mesh enclosure including a sliding door equipped with the lock on the left.

Referring now to Fig. 1, there is shown a portion of a cage or enclosure 9 provided with a door 10. Although illustrated as being of diamond mesh woven wire construction by way of example, it will be comprehended from the following description that an enclosure and door of other material, either solid or perforate, are equally capable of being equipped with a lock embodying the invention. Furthermore, although a door slidable over the wall of the enclosure is shown, it will be understood that a door sliding into a hollow wall is included within the scope of this specification.

As shown, the door 10 is movable from closed to open position on grooved wheels 12 carried on hangers 11 and rolling on a track 13 supported on upright posts 14 and 15 of the enclosure. The door 10 may be of any preferred construction, but is shown as comprising an outer frame constituted of channel iron members 21 (Fig. 2) faced with flat bar members 22 screwed thereto to form a hollow structure. Members 21 are preferably provided with a plurality of holes through which the terminations of the wire mesh are inserted and crimped, all in a well-known manner.

A horizontal cross-bar 23 comprised of two channel iron members 24 back-to-back in spaced relation (Fig. 11) is provided intermediate the sides of the door frame and at an elevation to suit the preferred position of the lock, which will now be described.

In essence, the lock 8 comprises a housing consisting of two parts, interchangeable interior mechanism, and a strike or keeper. For convenience, these parts will sometimes be referred to as the body and the cover. The cover will be that portion carrying the keyhole and the body will be that portion through which the knob extends.

Directing attention to Figs. 4, 5, 7, 8, and 9, the lock proper comprises the cover 31, which may be cast, drop-forged, or formed in any other suitable manner and is basically a flat plate provided around the top, bottom, and one side with a rim 32 projecting inwardly thereof. Approximately at the horizontal center line and toward the keeper side is provided a screw-threaded opening 33 for the reception of the body 30 of a tumbler-type cylinder lock mechanism 34, provided with a screw-thread of fine pitch for engagement in the opening 33. Cover 31 may be of slightly increased thickness, as at 35, to allow for a substantial number of threads and obviate stripping thereof.

Tumbler lock 34 has the usual tumbler mechanism, for example, of any well known type capable of an infinite number of key combinations and a rotatable barrel 36 containing the keyhole 37. Affixed to the inner end of the barrel 36 by screws 41 is the arm 42 provided with a slot 43 engaging a projection 44 integral with the barrel 36. In the body 30 are provided two threaded holes 45 and 45a for the reception of a stop screw 46, which is installed in either of the holes 45 and 45a, depending upon the selected assembly of the lock, and a projection 40 on the arm 42 is adapted to engage the stop screw 46. The threaded portion of the lock 34 is provided with a longitudinal V-shaped groove 51, and a screw 53 threadedly engaged in a lug 54 outstanding from cover 31 has a point to engage the slot 51 to maintain lock 34 non-rotatably in its operating position.

The body 61 of the lock housing coincides in external dimensions with the cover 31 and may be similarly formed as by casting, drop-forging, or the like, and likewise has a rim 62. It has, however, an additional flange 63 upstanding from its inner face, coextensive with the rim 62 and adapted to meet the inner face of cover 31 to maintain a predetermined space between the two parts for reception of the operating mechanism and provide ready access thereto. The flange 63 continues around the latch side of the lock as at 67 and terminates to leave a rectangular opening 68 in that edge of the lock. Formed in the body 61 is the frusto-conical recess 79 (Fig. 7) and provided at its bottom with a circular opening 80 for a purpose to be described. A lug 143 outstanding from the inner face of the body 61 serves as additional spacing means between the body 61 and cover 31.

To secure the two parts together, cover 31 is provided on its inner face with a plurality of (in this case four) integral bosses 64, each having a threaded hole 65; and body 61 is provided with a corresponding plurality of countersunk holes 66 to receive screws 69 which engage holes 65 to maintain the lock in assembled condition. Dowels 71 in plate 61 engage holes 72 in plate 31 to maintain accurate relationship between the body and cover.

Having described the lock housing, its mounting on the door will be detailed. Threaded holes 73 (Fig. 8) are provided in thickened portions 74 of the plate 61. In a side frame member 22 of the door are provided countersunk holes 77 to receive screws 76 whereby the edge of the lock adjacent the members 22 and 21 may be drawn tightly into contact therewith to maintain the lock in position on the door. The members 21 and 22 are provided with a rectangular opening 78 corresponding to the opening 68 and in alignment therewith. As an additional support, there is provided the hanger 81 (Figs. 10 and 11) comprising a neck 82 adapted to be engaged by the cross members 24, a head 83 resting on said cross members, and a lock engaging portion 84 adapted to fit closely in the space bounded by rims 32, 62 and 63. Hanger 81 is installed at the time the door cross members 24 are assembled and then the two halves of the lock assembled thereover, as clearly shown in Fig. 11. By reason of the portion 84 being curved to correspond with the rounded inner corners of the lock (Fig. 8), lateral displacement of the hanger is prevented, while the hanger effectively serves to support the lock at its inner end without screws or other additional fastenings.

To preserve the proper position of the wire mesh where the same meets the edge of the lock, the cut ends of the wire are inserted into the T-shaped channel bounded by rims 32, 62 and 63 (Figs. 8 and 9) and bent or hooked at the ends to interlock with the said channel. In this way dislodgement of the mesh by unauthorized persons for access to the knob is effectively prevented.

Figure 16:
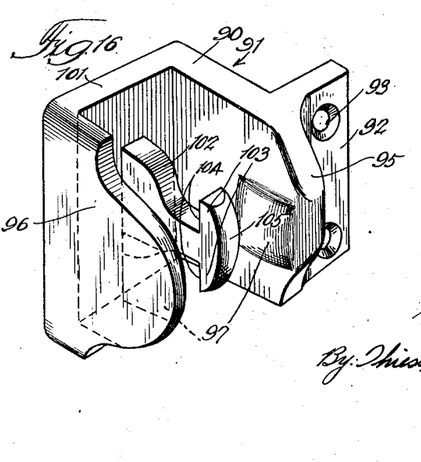
Fig. 16 is a perspective of the universal keeper.
Figure 17:
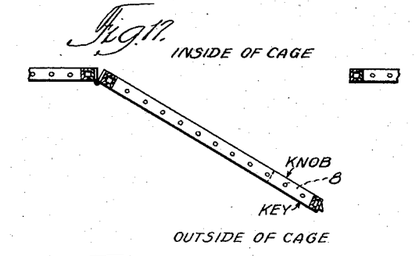
Fig. 17 is a cross-sectional plan view of a portion of an enclosure provided with a door swinging outwardly with the lock on the right.

At this juncture, the universal strike or keeper will be described by reference to Fig. 16. This keeper 91 may be used without alteration with all embodiments of the lock to be described, a mere change in its position relative to the frame of the enclosure sufficing for all installations. The keeper 91 comprises a mounting lug 92 provided with a plurality of countersunk holes 93 for reception of screws 94 by which the keeper is mounted on an upright post 75 of the enclosure, and is substantially of U-shaped cross section, one leg 90 of the U forming an extension of the lug 92 and extending therebeyond as at 95 to guide one face of the door as it is closed. The other leg 96 of the U acts as a guide for the opposite face of the door, and both legs may have integrally formed pads 97 ground or filed to an accurate dimension therebetween to insure alignment of the door latch with the keeper. The bottom of the U 101 is provided at its center with the necked projection 102 having flukes 103 forming with said neck straight surfaces 104 and terminating in an arcuate outer face 105.

Figure 2:
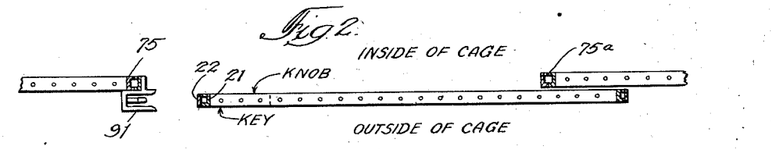
Fig. 2 is a cross-sectional view taken on the line 2—2 of Fig. 1.

The mechanism and installation of the lock will first be described under heading I (a) (1) hereinbefore tabulated. Referring to Figs. 1 and 2 the lock is shown mounted on a door outside the enclosure and locked on the left. The keeper 91 is mounted as shown, outside the enclosure, and the lock will be assembled in the form shown in Figs. 4 and 5.

Within body part 61 is mounted a latch member 111 (Fig. 6) comprising a knob 112 provided on its periphery with axially extending depressions 113 for engagement by the fingers, and a circular bearing portion 114 adapted to rotatably fit within the opening 89. As a part of knob 112 is the arm 115 relatively thin for a part of its length for clearance within the lock and extending into a thickened portion 116 having a hooked end 117. A flattened portion 118 is provided as is also a stop lug 121 and a spring attaching hook 122. Raised portions or pads 131 are provided on the cover 31 and body 61 to guide laterally the thickened extremity of the latch member 111 at its free end. Latch 111 is extended radially adjacent the bearing portion to provide the bearing surface 132 which, together with the boss 133 thereon, maintains the latch in proper operating position between the cover 31 and body 61. A pivot 134 extending from boss 133 is received in an aperture 135 in cover 31 to provide the other bearing for the latch 111.

Figures 6, 7, 10, 11:
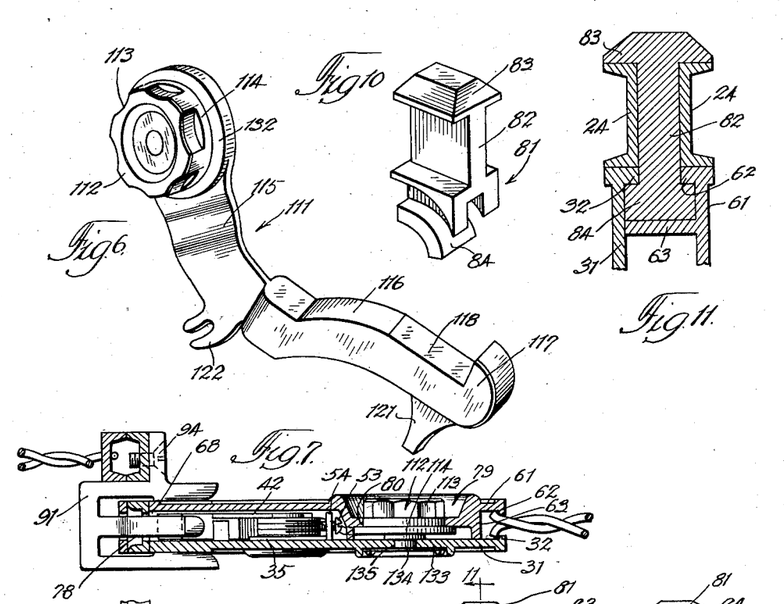
Fig. 6 is a perspective view of the latch member of the lock shown in Figs. 4 and 15.
Fig. 7 is a cross-sectional view taken on the line 7—7 of Fig. 1.
Fig. 10 is a perspective view showing the lock support proper.
Fig. 11 is a cross-sectional view taken on the line 11—11 of Fig. 8 and showing the lock support in position.
Figures 8, 9:
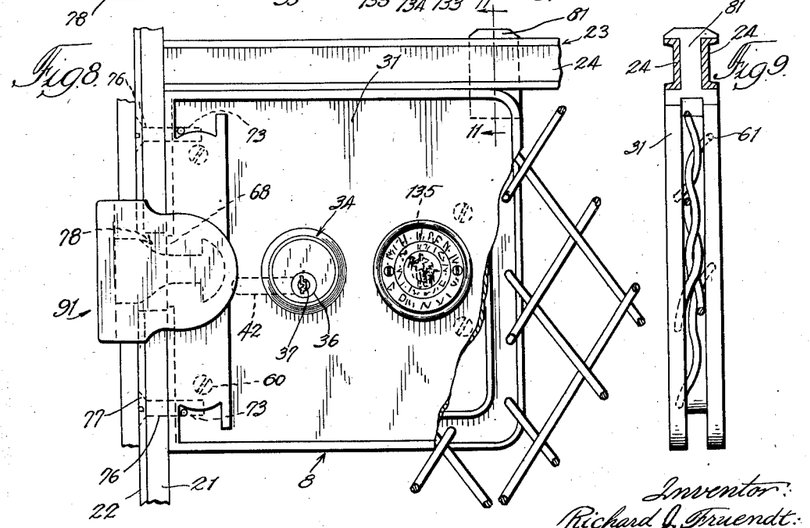
Fig. 8 is a somewhat enlarged elevational view of the lock shown in Fig. 1 and with certain parts broken away for clarity.
Fig. 9 is an end view corresponding to the elevational view of Fig. 8.

Intermediate a post 141 in body 61 and the hook 122 is the tension spring 142 serving to bias member 111 in a clockwise direction against a stop lug 212 extending from body 31.

Figures 3, 4, 5:
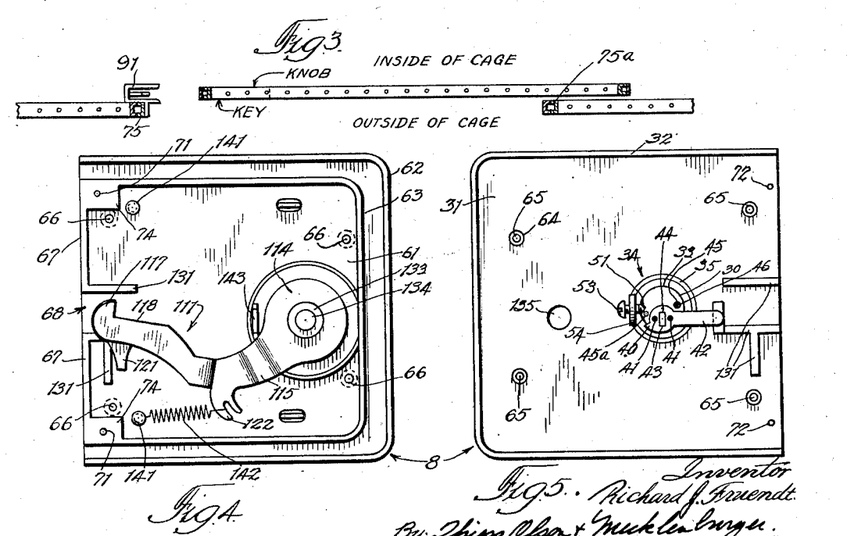
Fig. 3 is a cross-sectional view similar to that of Fig. 2 but showing an alternate position of the door inside the enclosure, but with lock still on the left.
Fig. 4 is an elevation of one-half of the lock proper in one embodiment thereof viewing the interior thereof.
Fig. 5 is an elevation similar to that of Fig. 4 of the other half of the lock proper of Fig. 4.

In the embodiment now being described the tumbler lock 34 will be arranged as shown in Fig. 5, the lock being positioned with set screw 53 engaging notch 51, the normal or locked position of arm 42 being, as shown, horizontal, and prevented from inadvertent turning movement counterclockwise, as viewed in Fig. 5, by stop screw 46 in hole 45 engaging the upper edge of the arm 42.

*Operation of lock under Condition I (a) (1)*

Referring to Fig. 2, and assuming the door is being closed, the hook 117 will engage with the lower flat face 104 of the keeper 91 and by reason of spring 142 opposing the force of gravity, such engagement is effectively maintained and opening of the door by simply pulling thereon is prevented.

To open the door from the outside, the key is inserted in tumbler lock 34 and turned counterclockwise (Fig. 8) to bring arm 42 against surface 118 on latch 111, whereby latch 111 is rotated against the spring 142 to release hook 117 from the keeper to unlock the door. After the door is slid to open position, the key may be withdrawn and the arm 42 is in its normal position (Fig. 5). Overtravel of the arm 42 in rotation to unlocking position is prevented by the projection 40 engaging the screw 46.

To open the door from the inside, the knob 112 is employed to rotate the latch 111 as before. Overtravel of the latch 111 is prevented by lug 121 striking post 141.

To close the door, it is merely moved to the left and the arcuate outer surface of hook 117 will strike the curved surface 105 of the keeper to cam the latch 111 downward and permit reengagement of the hook 117 thereof with the keeper.

*Operation of lock under Condition I (b) (1)*

Referring to Fig. 3, the only change made in the installation from the condition of Fig. 2 [Condition I (a) (1)] is that the keeper 91 is reversed so that mounting lug 92 is against the post 75 as shown, in which case the other fluke 103 of the keeper points downwardly and is engaged by the latch 111. The lock itself is not changed in any way, either as respects its interior mechanism or its mounting on the door. Thus it will be seen that the keeper only, being of reversible nature, may be used in two ways with the one mounting of the lock proper.

*Operation of lock under Condition I (a) (2)*

Figure 12:
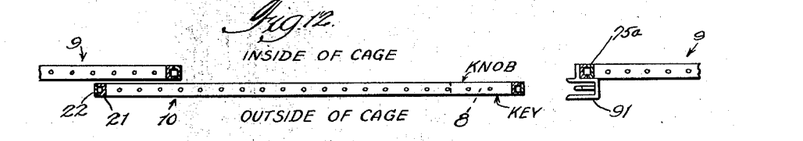
Fig. 12 is a view similar to Fig. 2 but showing the lock adapted to a right-hand mounting.

For this condition, illustrated in Fig. 12, the lock must be opened by removing the screws 60 and the cover 31, and spring 142 may be removed. Stop screw 46 need not be disturbed, as it will serve to limit motion of arm 42 by remaining in the same position as in Fig. 5.

The keeper 91 is mounted on the right-hand door post 75a in the position shown in Fig. 12.

Figure 15:
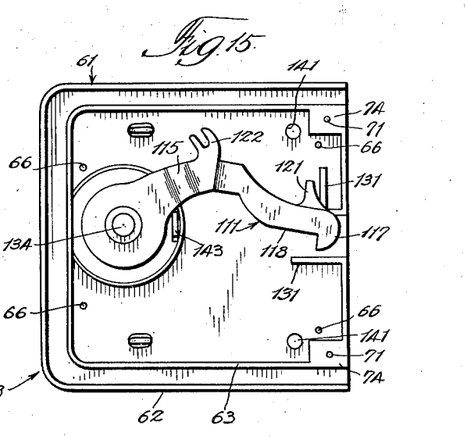
Fig. 15 is a view similar to Fig. 4 but with the lock in the position of Figs. 12 or 13.

Now that the entire lock has been rotated 180° to the position of Fig. 15, the force of gravity or the spring, if left installed, acting on the latch 111 will rotate the same clockwise to maintain engagement of hook 117 with the fluke 103 when the door is locked.

Opening of the lock may be effected by the key or by the knob as before, the principal difference being that now the tension of the spring 142 may be replaced by the force of gravity. Overtravel of the arm 42 in either direction is still effected by the arm 42 or its projection 40 striking the screw 46.

*Operation of lock under Condition I (b) (2)*

Figure 13:
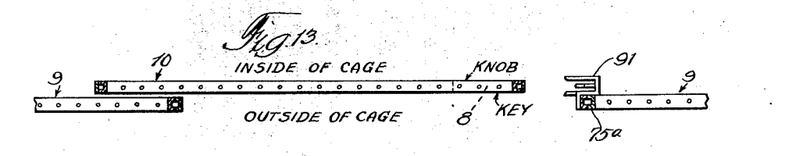
Fig. 13 is a view similar to Fig. 3 but showing the lock adapted to a right-hand mounting.
Figure 14:
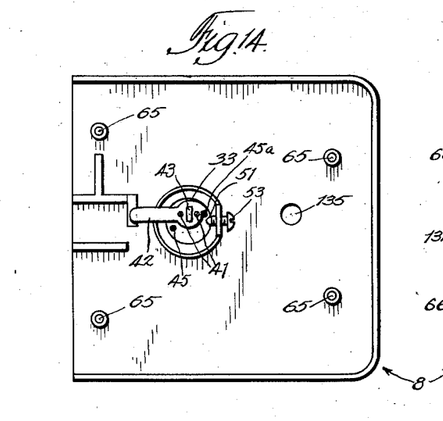
Fig. 14 is a view similar to Fig. 5 but with the lock in the position of Figs. 12 and 13.

Installation under this condition (Fig. 13) requires no disturbance of the lock proper from its position of Fig. 12, but merely a different location of the keeper to the position shown.

The method of operation is identical with that described in connection with Fig. 12.

The construction and operation of the lock under conditions headed II are now to be described.

Figures 25, 26:
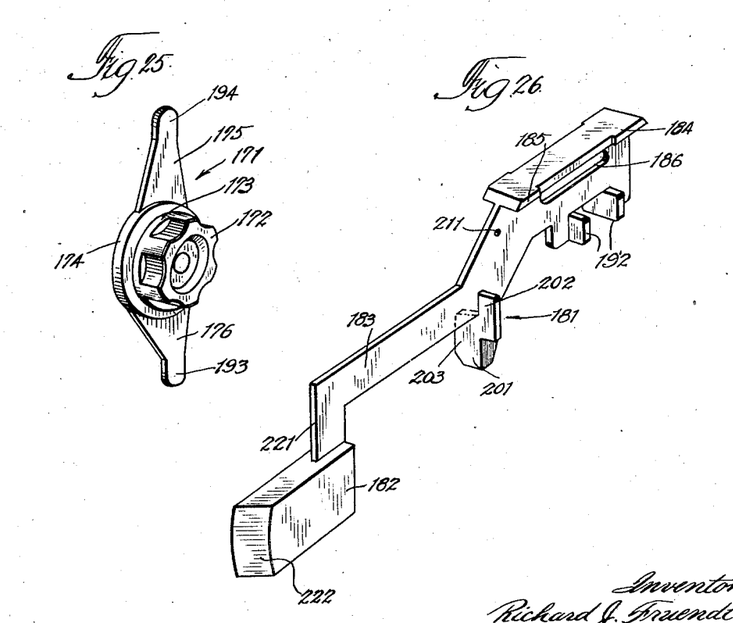
Fig. 25 is a perspective view of the operating knob of the embodiments shown in Figs. 21 and 23.
Fig. 26 is a perspective view of the bolt member of the embodiments shown in Figs. 21 and 23.

By removing the cover 31 and detaching the spring 142 from the hook 121, the latch 111 may be removed and a rocker 171 may be substituted (Fig. 25). The latter comprises a knob 172 of the same form as the knob 112, a bearing portion 173, and a flanged portion 174 outwardly extended in two opposed arms 175 and 176 terminating in head portions 194 and 193 respectively. These arms, it will be noted (Fig. 23) are of slightly different lengths and for convenience will be termed the long arm 175 and the short arm 176, respectively. As will appear, no reason exists for such difference in length beyond the fact that knob receiving aperture 80, for convenience of design, is not centrally located between the top and bottom of the lock.

Figure 21:
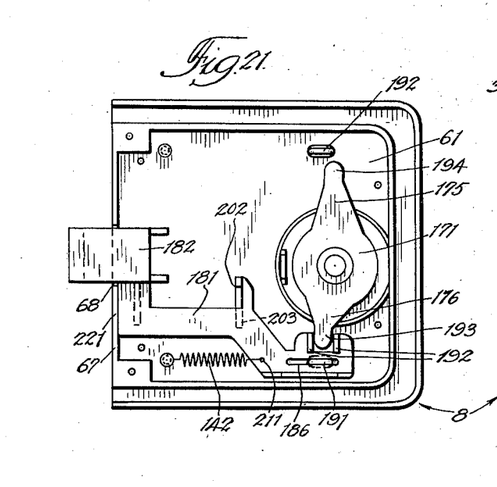
Fig. 21 is an interior view of one of the lock embodiments as used in Figs. 17 and 18, the cover being removed.

In Fig. 21, the rocker 171 is shown in place with the head 193 engaging the sliding latch 181. Referring now to Fig. 26, the latch 181 comprises the bolt nose 182 adapted slidably to engage the slot 68 and be guided thereby. Said bolt is carried by an arm 183 terminating in a head 184 provided at its edges with guide pads 185 slidably engaging the inner faces of parts 31 and 61. Beneath head 184 and piercing the arm 183 is the elongated slot 186 adapted to slidably engage either one of two guide posts 191 or 192 extending from body 61 and of generally flat-sided form as shown. Also forming part of the latch 181 are the transverse pads 192 adapted to be engaged by the rounded heads 193 and 194 of the rocker 171. Intermediate the bolt nose 182 and pads 192 is the extension 201 comprising two pads 202 and 203 adapted to be engaged by the arm 42 of the cylinder lock 34.

From a consideration of the construction of the latch 111, arm 171 and latch member 181 it will be seen that the latch 111 may be instantaneously removed and as quickly replaced by arm 171 and latch member 181 to form the modified structure shown in Fig. 21. The same spring 142 used in the embodiment of Fig. 4 is connected to the bolt 181 at the hole 211. A projection 212 is provided in cover 31 as a stop to limit inward movement of the bolt nose 182 by engagement of the inner edge of the latter therewith.

For the door installations shown in Figs. 17, 18, 19 and 20, the keeper 91 is not employed, but the post 75 or 75a is provided with a rectangular aperture (not shown) coincident with opening 78 for engagement by the bolt head 182.

*Operation of lock under Condition II (a) (1)*

Figure 18:
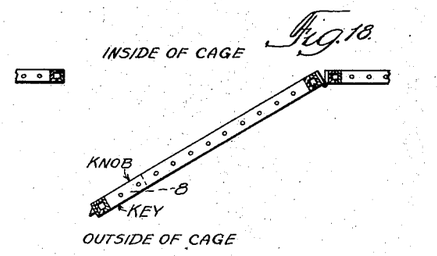
Fig. 18 is a view similar to Fig. 17 but with the lock on the left.
Figure 22:
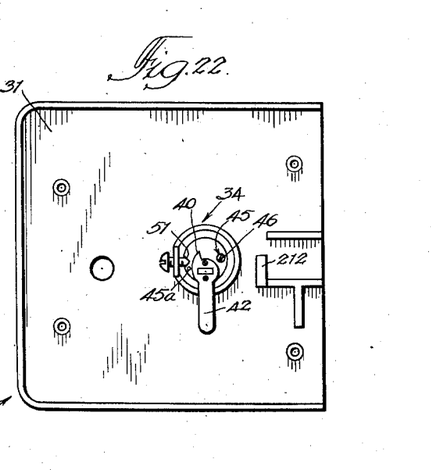
Fig. 22 is a view of the inside of this cover.

Under this condition the door arrangement is as shown in Fig. 18 and the lock assembly is as in Figs. 21 and 22.

Assuming the bolt nose 182 is engaging the aperture in post 75 and the door is locked, the key is inserted and arm 42 is turned clockwise as viewed in Fig. 22 to engage the pad 203, whereby the bolt 181 is retracted into the lock housing against bias of the spring 142 to free the door for opening, the rocker 171 meanwhile turning freely. Bolt 181 is guided effectively by the bolt nose 182 moving in apertures 68 and 78 and the slot 186 engaging the post 191. Upon release of the key, the bolt is free to return to the position shown in Fig. 21, the outer edge 221 of the arm 183 striking the inside of the rim 67 to limit the movement. In this position the bolt is ready for relatching upon closing of the door, the beveled face 222 of the nose 182 acting in the usual manner. Operation of the lock by the knob 172 rotates the rocker 171 to cause the short arm 176 through its head 193 to engage the pads 192 and actuate the bolt 181. It will be noted that stop screw 46 is now in hole 45a.

*Operation of lock under Condition II (a) (2)*

For this type of installation (Fig. 17) the lock is left unchanged from the assembly shown in Figs. 21 and 22 except that it is rotated in its plane 180°. Operation follows that just described in the preceding paragraph.

*Operation of lock under Condition II (b) (1)*

Figure 19:
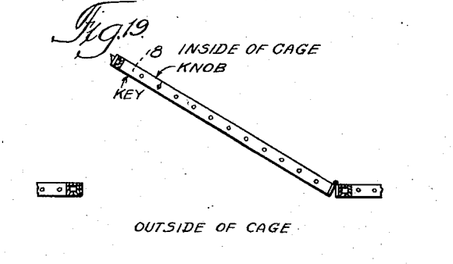
Fig. 19 is a view similar to Fig. 18 but with the door swinging inwardly.
Figure 23:
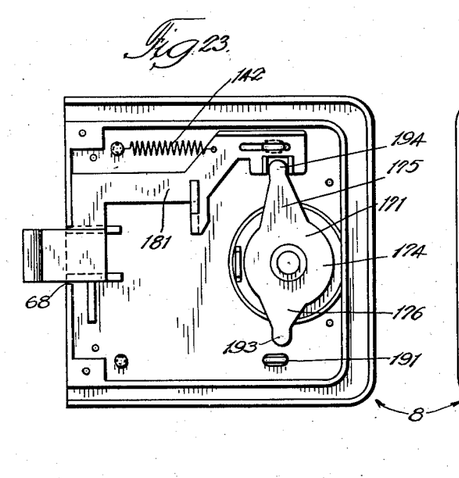
Fig. 23 is a view similar to Fig. 21 but of another of the embodiments as used in Figs. 19 and 20, the cover likewise being removed.
Figure 24:
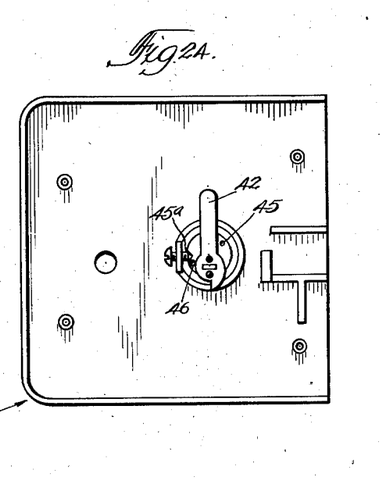
Fig. 24 is a view of the inside of this cover.

For this position, shown in Fig. 19, the lock is arranged as in Figs. 23 and 24. Arm 171 is undisturbed but bolt 181 is removed, together with its spring 142, and turned over to the position shown in Fig. 23. This has the effect of placing the beveled nose 222 of the bolt to the keyhole side as seen in Fig. 19. Operation is similar to that just described for Figs. 17 or 18 except that in this instance arm 42 will engage the other pad 202 to operate the bolt 182, and long arm 175 actuates the bolt 181 through pads 192.

*Operation of lock under Condition II (b) (2)*

Figure 20:
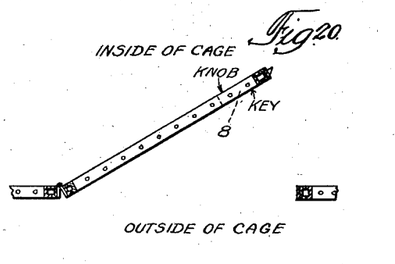
Fig. 20 is a view similar to Fig. 19 but with the lock on the right.

For this position, shown in Fig. 20, the lock is arranged as shown in Figs. 23 and 24 except that it is rotated 180° in its plane. Operation follows that described heretofore. However, stop screw 46 is now inserted in hole 45a.

Figure 27:
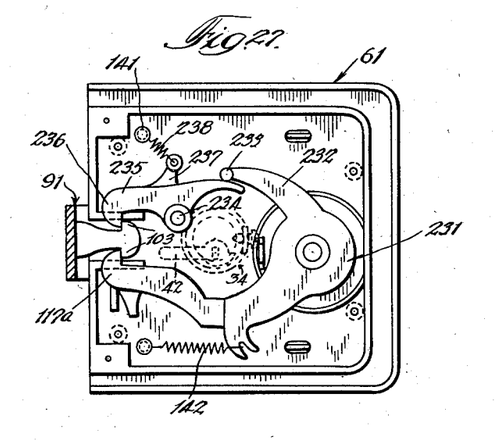
Fig. 27 is an elevational view showing the interior mechanism of an alternative form of lock with the parts in locking position.
Figure 28:
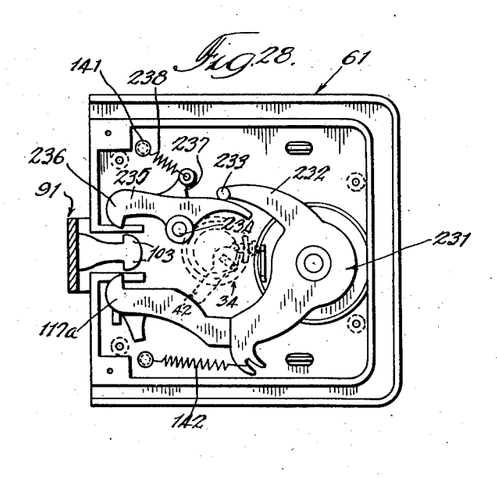
Fig. 28 is a view similar to that of Fig. 27 but showing the parts in unlocking position.

To afford greater protection against picking of the lock it is sometimes desirable to provide a two-part latching mechanism, each member thereof being adapted to engage one of the flukes 103 of the keeper 91. A typical such embodiment is shown in Figs. 27 and 28, wherein the first depicts the lock in locked position and the second, the lock in unlocked position.

The casing is the same as used in any of the embodiments hereinbefore described with a minor addition to be referred to. Likewise the keeper 91 is employed. However, the latching mechanism is of different form. The principal portion thereof comprises a latch member 231 which duplicates the member 111 (Fig. 6) in all respects except that it is provided with an additional fixedly connected arm 232 extending from the flange 132 and having at its extremity a pin 233.

Arranged to pivot on a stud 234 outstanding from the inner face of the body 61 is a rocker 235 having one arm adapted to be engaged by the pin 233 and the other forming a hooked portion 236 identical with hook 117 (Fig. 6). A projection 237 extending from the rocker 235 receives one end of a spring 238 fastened at its other end to the post 141. The key-operated lock 34 is identical with and arranged the same as in Fig. 5.

In view of the description of the operation of the lock given in connection with Fig. 4, it will be noted that upon manual operation of the knob 112 or of the key-operated lock 34 the arm 232 will be rotated with the member 111 to actuate through its pin 233 the rocker 235 in a clockwise sense. Accordingly the hooked portion, shown as 117a, of the member 231 and the hooked portion 236 are simultaneously disengaged from the flukes 103 and the door may be opened. To lock the door, the lock 34 having been released, it is merely moved to the left or right, depending on the mounted position of the lock and the portions 117a and 236 reengage the keeper, such engagement being maintained by springs 238 and 142.

It will be apparent that the lock just described may be utilized without change of construction in any of the arrangements of Figs. 2, 3, 12 or 13.

From the foregoing it will be comprehended that I have provided a lock applicable to a large variety of applications. Although the description has been limited to a door lock releasable from one side by a knob and from the other side by a key, it will readily be seen that an extension may be provided on the pivot 134 to carry another knob, so that knob operation is permitted from both sides of the door; and a keyhole and cylinder lock mechanism may be provided opposite the lock 34 for the same purpose.

Nor is it intended that the device be limited to use with a cylinder or tumbler type of lock, since I contemplate that any key-operated or dial-type combination lock may be employed to operate the arm 42.

It is likewise within the scope of the invention to provide a detent or other common type of bolt catch in combination with the mechanism disclosed, so that the bolt 181 or latch 111 may be held in a position whereby closing of the door does not cause the bolt or latch, as the case may be, to engage its keeper or strike.

Furthermore, the lock is readily adaptable to a mortise type of mounting within a door of wood or the like, as its construction involves a minimum thickness of case for proper accommodation of the necessary working parts.

However, the principal advantage resides in a minimum number of simple parts quickly interchangeable to yield locks for differing types of installation. In that way, the manufacturer's cost of tools, dies, and other manufacturing equipment is reduced to a considerable extent; the dealer's problems of stocking the required types of locks are substantially minimized; and a user desiring to change a lock already installed to one of another kind may do so with a very small outlay for the few parts required, and without removing the entire lock from the door or disturbing its operative connection therewith.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In combination in a latch-lock adapted to be mounted in any one of a plurality of predetermined positions to meet various conditions encountered in practice, a casing; a slidable bolt member adapted for mounting within said casing and to be guided thereby, and adapted to be initially installed interchangeably in either of two positions with respect to said casing, said member including a U-shaped aperture; means associated with said casing including a manually engageable portion and a pair of oppositely extended arms, said arms being alternatively adapted to mate with said aperture in each position of said member, and key-operated means for operating said member, both sets of means being independently actuable for moving said member from locking to unlocking position; and tension means intermediate said member and casing normally to bias said member to locking position.

2. In combination in a latch-lock adapted to be mounted in any one of a plurality of predetermined positions to meet various conditions encountered in practice, a casing; a swingable latch member mounted within said casing and disengageable therefrom; a manually engageable portion integral with said member and accessible exteriorly of said casing; and key-operated means for actuating said member; said member being operable from locking to unlocking position by either said manually engageable portion or said key-operated means; and said member being freely swingable under gravity to return to locking position upon release of said manually engageable portion or return to normal of said key-operated means.

3. In combination in a latch-lock adapted to be mounted in any one of a plurality of predetermined positions to meet various conditions encountered in practice, a casing; a slidable bolt member adapted for mounting within said casing and to be guided thereby, and adapted to be initially installed in either of two positions with respect to said casing without alteration in said casing; means associated with said casing including a manually engageable portion, and key-operated means, both sets of means cooperating with said member and actuable independently for moving said member from locking to unlocking position; and tension means intermediate said member and casing normally to bias said member to locking position.

4. In combination in a latch-lock adapted to be mounted in any one of a plurality of predetermined positions to meet various conditions encountered in practice, a casing; a slidable bolt member adapted for mounting within said casing and to be guided thereby, and adapted to be initially installed in either of two positions with respect to said casing without alteration in said casing; means associated with said casing including a manually engageable portion, and key-operated means, both sets of means cooperating with said member and actuable independently for moving said member from locking to unlocking position; and tension means intermediate said member and casing normally to bias said member to locking position.

5. In combination in a latch-lock adapted to be mounted in any one of a plurality of predetermined positions to meet various conditions encountered in practice, a casing; a swingable latch member mounted within said casing and disengageable therefrom; a manually engageable portion integral with said member and accessible exteriorly of said casing; tension means intermediate said member and casing to bias said member into locking position; and key-operated means for actuating said member, said member being operable from locking to unlocking position and vice versa by either said manually engageable portion or said key-operated means; and said member being restored to locking position under action of said tension means upon release of said manually engageable portion or of said key-operated means.

6. A latch-lock for a door comprising in combination a casing including a front plate and a rear plate and means for fastening said plates together, a latch member supported for movement between said plates and including a knob accessible exteriorly of said casing and engageable by the operator, and an arm extending radially from said knob, said arm terminating in a hooked portion; tension means intermediate said member and casing to bias said hooked portion into locking position and a key-operated device including an arm adapted to rotate said member upon actuation of the key to release said member from locking position.

7. A reversible latch-lock for a door comprising in combination a casing including a front plate and a rear plate and means for fastening said plates together; a latch member supported for movement between said plates and including a knob accessible exteriorly of said casing and engageable by the operator and an arm extending radially from said knob, said arm terminating in a hooked portion, disconnectible tension means intermediate said casing and said member which when connected biases said hooked portion into locking position when said lock is in one of its operating positions and which when disconnected will permit free movement of said hooked portion into locking position under the influence of gravity when said lock is in the other of its operating positions.

8. A reversible latch-lock for a door comprising in combination a casing including a front plate and a rear plate and means for fastening said plates together; a latch member supported for movement between said plates and including a knob accessible exteriorly of said casing and engageable by the operative and an arm extending radially from said knob, said arm terminating in a hooked portion, disconnectible tension means intermediate said casing and said member which when connected biases said hooked portion into locking position when said lock is in one of its operating positions and which when disconnected will permit free movement of said hooked portion into locking position under the influence of gravity when said lock is in the other of its operating positions, and a key-operated device including an arm adapted to move said member upon actuation of the key to release said member from locking position.

9. A reversible latch-lock for a door adapted to be associated with a jamb having a keeper cooperating with said lock comprising in combination a casing, a rotatable latch member supported within said casing and including a hook portion to engage said keeper, and a key-operated device having a portion to release said member from locking position upon actuation of said key, said device being adapted to be initially installed in either of two positions depending upon the position of the lock with respect to the door.

10. A reversible latch-lock for a door adapted to be associated with a jamb having a keeper cooperating with said lock comprising in combination a casing, a rotatable latch member supported within said casing and including a hook portion to engage said keeper, manually operable means including a knob engageable by the operator for releasing said member from locking position, and a key-operated device having a portion to release said member from locking position upon actuation of said key, said device being adapted to occupy either of two positions depending upon the position of the lock with respect to the door.

11. A reversible latch-lock for a door adapted to be associated with a jamb having a keeper cooperating with said lock, a casing, a bolt member slidably supported within said casing and adapted to occupy either of two selectable operating positions therein for engaging the keeper, said member having an aperture therein, manually operated means including a portion engageable by the operator and two oppositely extending arms, each arm being adapted to engage said aperture in one of the two said operating positions of said member.

12. A reversible latch-lock for a door adapted to be associated with a jamb having a keeper cooperating with said lock, a casing, a bolt member slidably supported within said casing and adapted to occupy either of two selectable operating positions therein for engaging the keeper, said member having an aperture therein, manually operated means including a portion engageable by the operator and two oppositely extending arms, each arm being adapted to engage said aperture in one of the two said operating positions of said member, and a key-operated device having a portion adapted to engage said bolt member to release said member from locking engagement independently of said manually operated means.

13. A reversible latch-lock for a door adapted to be associated with a jamb having a keeper cooperating with said lock, a casing, a bolt member slidably supported within said casing and adapted to occupy either of two selectable operating positions therein for engaging the keeper, said member having an aperture therein, manually operated means including a portion engageable by the operator and two oppositely extending arms, each arm being adapted to engage said aperture in one of the two said operating positions of said member, and a key-operated device having a portion adapted to engage said bolt member to release said member from locking engagement, said portion being adjustable with respect to said device to mate with said bolt member in the operating position then occupied.

RICHARD J. FRUENDT.

REFERENCES CITED

The following references are of record in the file of this patent:

UNITED STATES PATENTS

| Number | Name | Date |
|---|---|---|
| 414,332 | Seely | Nov. 5, 1889 |
| 1,667,600 | Martinek | Apr. 24, 1928 |
| 1,933,865 | Martinek | Nov. 7, 1933 |
| 2,304,612 | Voight | Dec. 8, 1942 |
| 2,212,428 | Watters | Aug. 20, 1940 |
| 123,444 | Bayer | Feb. 6, 1872 |
| 610,813 | Houser | Sept. 13, 1898 |
| 1,272,967 | Kirsch | July 16, 1918 |
| 1,200,178 | Ehrman | Oct. 3, 1916 |
| 1,560,914 | Moore | Nov. 10, 1925 |
| 1,816,259 | Lande | July 28, 1931 |